Feb. 27, 1968     H. E. BRANSON     3,370,427
AUXILIARY CONTROL FOR DUAL AUTOMOTIVE BRAKE SYSTEMS
Filed March 10, 1966
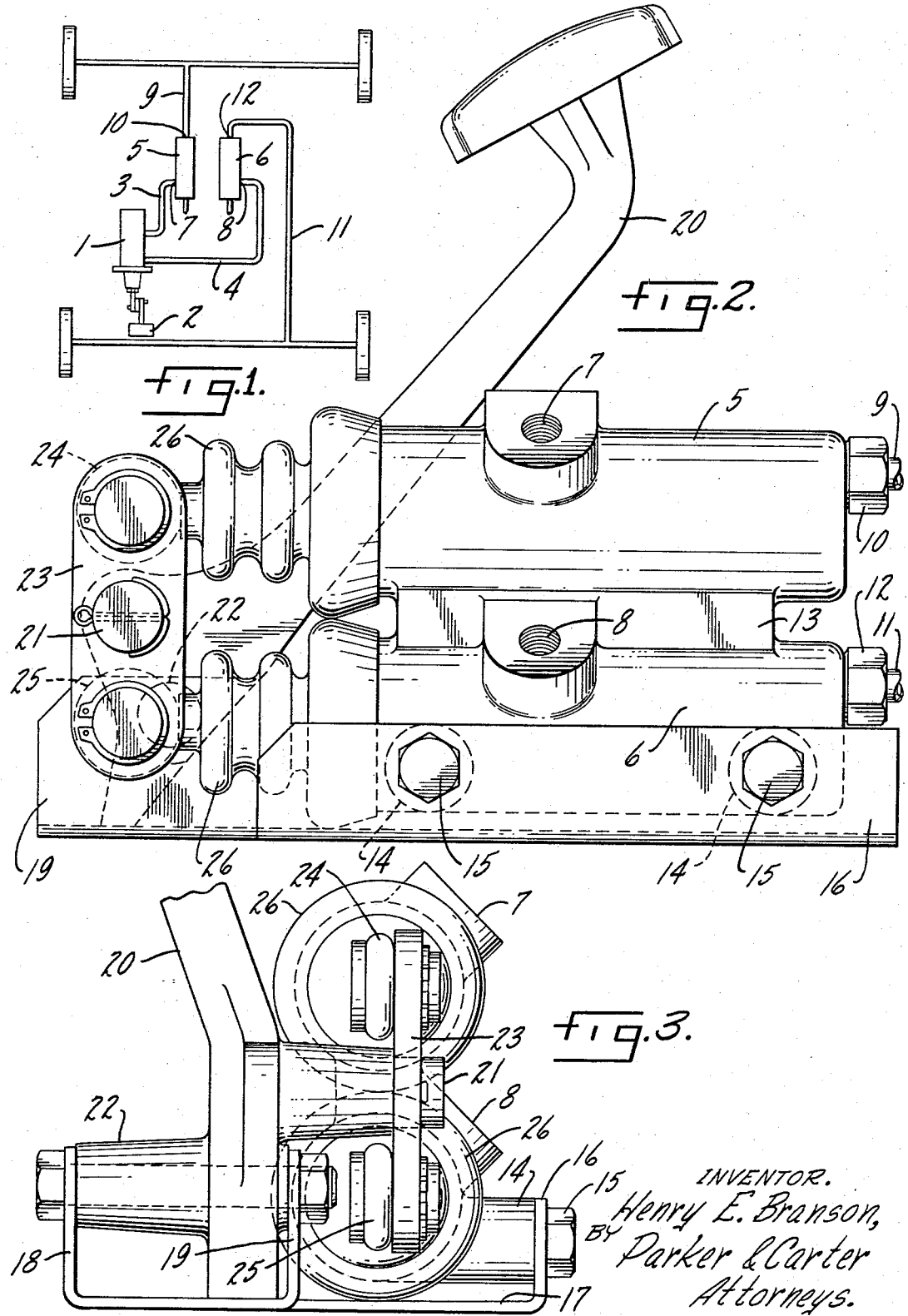

United States Patent Office 3,370,427
Patented Feb. 27, 1968

3,370,427
AUXILIARY CONTROL FOR DUAL AUTOMOTIVE BRAKE SYSTEMS
Henry E. Branson, Chicago, Ill., assignor to Stromberg Hydraulic Brake and Coupling Company, Chicago, Ill., a corporation of Illinois
Filed Mar. 10, 1966, Ser. No. 533,171
7 Claims. (Cl. 60—54.5)

ABSTRACT OF THE DISCLOSURE

This invention is for use in connection with the conventional type of dual automotive brake control systems where one or more master cylinders under control of the driver actuates the brakes. The purpose of this invention is to provide in association with each of the two or more elements of the dual system, separate means which may be controlled by an instructor to control all the brakes of the dual system independent of a student control of the master cylinder. Each of the instructor control cylinders is provided with check valves so that the control of the student is not interfered with until the instructor has operated his control and taken over the braking system.

---

This invention relates to improvements in controls for dual hydraulic automotive brake systems and includes means whereby the vehicle brakes may be applied independent of the usual driver controlled master cylinder or cylinders.

One object of the invention is to provide means to temporarily interrupt the paths of hydraulic pressure between the master brake cylinder or cylinders and some or all of the vehicle brakes and to apply at the same time fluid pressure to said brakes independent of the master cylinder or cylinders.

Other objects will appear from time to time throughout the specification and claims.

The invention is illustrated more or less diagrammatically in the accompanying drawings, wherein FIGURE 1 is a diagrammatic flow sheet;
FIGURE 2 is a side elevation of the device;
FIGURE 3 is an end view.

Like parts are indicated by like numerals throughout the specification and drawings.

The automotive vehicle is equipped with a master dual brake cylinder assembly 1 actuated by a pedal 2 in the usual way. The details of the master cylinder assembly are conventional and form no part of the present invention. When the master cylinder assembly is actuated, it applies pressure, for example, in separate hydraulic systems through a duct 3 to the front wheels of the vehicle and through a duct 4 to the rear wheels. Thus each of the hydraulic systems—and there might be two or more—provide brake pressure for one or more separate vehicle wheels. This is the usual well known automotive dual brake system.

In series respectively with ducts 3 and 4, are auxiliary control cylinders 5 and 6. Duct 3 is connected to the cylinder 5 at the entrance port 7. Duct 4 is connected to the cylinder 6 at entrance port 8. A duct 9 leads from port 10 of cylinder 5 to one or more independent brake cylinders. Duct 11 leads from port 12 of cylinder 6 to other independent wheel brake cylinders.

The two cylinders 5 and 6 are for convenience joined by a web 13, the lower cylinder 6 having extended lugs 14 to engage holding screws 15 on the flange 16 of a supporting bracket 17. Pivoted on the ears 18 and 19 of the bracket 17 is an actuating pedal lever 20. Extending laterally from this lever toward the cylinder is a lug 21 eccentric with respect to the lever pivot 22. The lug 21 carries a walking beam 23. Pivoted on each end of the walking beam equidistant from the central axis of the lug 21 are links 24 and 25 which carry push rods masked by the bellows 26 to actuate pistons not illustrated in the cylinders 5 and 6 respectively.

The two auxiliary cylinders are of the same type as those disclosed in my co-pending application Serial No. 424,920 filed January 12, 1965, now Patent No. 3,302,402 for Hydraulic Force Transmission System, and need no further illustration here. When the lever 20 is in the inactive position, there is a free flow passage from duct 3 through cylinder 5 and duct 9 to one set of brakes and a free flow passage from duct 4 through cylinder 6 and duct 11 to another set of brakes. When the lever 20 is depressed the bypasses are closed by the movement of the two pistons in unison in response to the pedal pressure, this temporarily interrupts flow through the ducts 3 and 4 but independent of the master cylinder applies pressure to the brakes through the ducts 9 and 11.

Assuming that there is no loss of hydraulic fluid in either of the duct systems controlling the brakes, the pressure on the lever will apply brake pressure on all of the brakes. But if it should happen that one of the duct systems loses hydraulic fluid, movement of the lever will first seat, at the end of its excursion, the piston which has lost its hydraulic fluid and then and then only will further lever movement enable the operator to apply pressure on the other piston. This will result in a much greater movement of the lever before any of the brakes take hold and this will warn the user of the auxiliary system that something is wrong. Control is not entirely lost because some of the brakes will be applied even though the other brakes are useless.

The two hydraulic systems so far as the auxiliary cylinders are concerned are entirely separate and independent. The effect on those hydraulic systems resulting from the application of pressure through the lever 20 is substantially the same provided the systems are both in full operation. But if one system, having lost hydraulic fluid is inoperative, the other system remains in full force and effect, the disadvantage being, of course, that under these circumstances only one set of brakes can be used.

I claim:
1. In an automotive vehicle, a dual hydraulic brake system including a master cylinder assembly, a plurality of separate hydraulic systems each independently actuated by the master cylinder to provide brake application pressure to independent separate vehicle wheels, means, in series with each hydraulic system, independent of the master cylinder, adapted simultaneously temporarily to interrupt the flow path of each system toward the brakes controlled by it and simultaneously to apply pressure to such brakes through such system independent of the master cylinder, the interrupting means including separate auxiliary cylinders, one in series with each system, bypasses in said cylinders, normally open to hydraulic fluid flow from the master cylinder, means for closing said bypasses and simultaneously independent of the master cylinder applying hydraulic pressure through each system to the brakes served thereby.

2. The device of claim 1 characterized by the fact that the closing means includes a piston in each cylinder, means for biasing each piston to open bypass position and means for displacing the piston to close the bypass and apply pressure through each hydraulic system to the brakes served thereby.

3. The device of claim 2, characterized by the fact that the auxiliary cylinders are hydraulically independent.

4. The device of claim 3 characterized by the fact that the means for actuating the pistons are balanced to provide under ordinary circumstances substantially equal and uniform piston travel.

5. The device of claim 4 characterized by the fact that a balanced piston actuated mechanism provides automatic warning in the event that the hydraulic resistance to piston movement in one cylinder substantially exceeds the resistance to piston movement in the other.

6. The device of claim 5 characterized by the fact that the piston actuating means includes a lever, a walking beam pivoted on the lever and connections between the opposite ends of the walking beam and the pistons, there being a stop associated with each piston adapted equally to limit movement thereof, the walking beam being free to rotate about its pivot on the lever to seat one of the pistons before substantial movement of the other occurs whenever hydraulic resistance to movement of the first-mentioned piston is absent.

7. The device of claim 6 characterized by the fact that under normal operating conditions the pistons may not contact said stop but when one stop is contacted before the other excessive lever movement occurs to warn the driver of absence of hydraulic fluid in one cylinder.

References Cited

UNITED STATES PATENTS 3,208,223   9/1965   Watanabe _____ 60—54.5

MARTIN P. SCHWADRON, *Primary Examiner.*

ROBERT R. BUNEVICH, *Examiner.*